United States Patent
Ki

(10) Patent No.: US 10,552,062 B2
(45) Date of Patent: Feb. 4, 2020

(54) SYSTEM AND METHOD FOR STORING VERY LARGE KEY VALUE OBJECTS

(71) Applicant: Samsung Electronics Co., Ltd., Suwon-si, Gyeonggi-do (KR)

(72) Inventor: Yang Seok Ki, Palo Alto, CA (US)

(73) Assignee: SAMSUNG ELECTRONICS CO., LTD. (KR)

(*) Notice: Subject to any disclaimer, the term of this patent is extended or adjusted under 35 U.S.C. 154(b) by 0 days.

(21) Appl. No.: 15/967,302

(22) Filed: Apr. 30, 2018

(65) Prior Publication Data

US 2019/0114094 A1 Apr. 18, 2019

Related U.S. Application Data

(63) Continuation-in-part of application No. 15/876,028, filed on Jan. 19, 2018.

(60) Provisional application No. 62/635,311, filed on Feb. 26, 2018, provisional application No. 62/474,039, filed on Mar. 20, 2017, provisional application No. 62/561,625, filed on Sep. 21, 2017, provisional application No. 62/562,219, filed on Sep. 22, 2017.

(51) Int. Cl.
*G06F 12/00* (2006.01)
*G06F 3/06* (2006.01)
*G06F 11/16* (2006.01)

(52) U.S. Cl.
CPC .......... *G06F 3/0619* (2013.01); *G06F 3/065* (2013.01); *G06F 3/067* (2013.01); *G06F 3/0652* (2013.01); *G06F 3/0665* (2013.01); *G06F 11/1666* (2013.01)

(58) Field of Classification Search
CPC ...... G06F 3/0619; G06F 3/065; G06F 3/0652; G06F 3/0665; G06F 3/067; G06F 11/1666
See application file for complete search history.

(56) References Cited

U.S. PATENT DOCUMENTS 7,487,289 B2 * 2/2009 Ito ...................... G06F 11/1076
711/112
9,417,963 B2 8/2016 He et al.
(Continued)

OTHER PUBLICATIONS

Wu et al., "An Efficient B-Tree Layer for Flash-Memory Storage Systems," Department of Computer Science and Information Engineering National Taiwan University, Taipei, Taiwan, pp. 1-20.

*Primary Examiner* — Daniel D Tsui
(74) *Attorney, Agent, or Firm* — Innovation Counsel LLP

(57) ABSTRACT

A data storage system includes: a plurality of data storage devices for storing a plurality of objects of a key-value pair; and a virtual storage layer that applies different data reliability schemes including a data replication scheme and an erasure coding scheme based on a size of an object of the plurality of objects. The plurality of objects includes a first object having a first size and a second object having a second size that is larger than the first size. The virtual storage layer classifies the first object as a small object, applies the data replication scheme, and stores the small object across one or more of the plurality of data storage devices. The virtual storage layer classifies the second object as a huge object, splits the huge object into one or more chunks of a same size, applies the erasure encoding scheme, and distributedly stores the one or more chunks across the plurality of data storage devices.

20 Claims, 12 Drawing Sheets

(56) References Cited

U.S. PATENT DOCUMENTS

| | | |
|---|---|---|
| 9,594,633 B2 | 3/2017 | Colgrove et al. |
| 9,639,268 B2 | 5/2017 | Patterson, III |
| 2015/0302111 A1 | 10/2015 | Yue et al. |
| 2016/0099810 A1 | 4/2016 | Li et al. |
| 2017/0308437 A1 | 10/2017 | Usvyatsky et al. |

* cited by examiner

SYSTEM AND METHOD FOR STORING VERY LARGE KEY VALUE OBJECTS

CROSS-REFERENCE TO RELATED APPLICATION(S)

This application claims the benefits of and priority to U.S. patent application Ser. No. 15/876,028 filed on Jan. 19, 2018, which claims the benefit of U.S. Provisional Patent Application Ser. No. 62/635,311 filed on Feb. 26, 2018, U.S. Provisional Patent Application Ser. No. 62/474,039 filed on Mar. 20, 2017; U.S. Provisional Patent Application Ser. No. 62/561,625 filed on Sep. 21, 2017; and U.S. Provisional Patent Application Ser. No. 62/562,219 filed on Sep. 22, 2017, the disclosure disclosures of which are incorporated herein by reference in its entirety.

TECHNICAL FIELD

The present disclosure relates generally to data storage systems, more particularly, to a method for storing very large key value objects in a data storage system.

BACKGROUND

Data reliability is a key requirement of a data storage system. Data reliability using traditional block devices has been well studied and implemented through various data replication technologies such as Redundant Array of Independent Disks (RAID) and erasure coding. RAID spreads (or replicates) data over a set of data storage drives to prevent permanent data loss of a particular drive. RAID largely falls into two categories: a complete mirror image of the data is kept on a second drive, or parity blocks are added to the data to be able to recover failed blocks in a failure. Erasure coding adds a bunch of parity-like blocks using complex algorithms providing robust data protection and recovery that can tolerate high levels of failure. For example, erasure coding can virtualize physical drives create a virtual drive that can be spread over more than on physical drives to achieve speedy recovery. Data replication using RAID may be too expensive for replicating large objects, and erasure coding may waste storage spaces for small objects.

A key-value solid-state drive (KV SSD) is a new type storage that has different interfaces and semantics compared to conventional block devices such as hard disk drives (HDD) and solid-state drives (SSD). A KV SSD can directly store data values of key-value pairs. Data values stored in a KV SSD may get huge or small depending on an application and the characteristics of the data. There is a need for an efficient data reliability model for efficiently storing objects having different sizes without having performance bottleneck and space limitations.

SUMMARY

According to one embodiment, a data storage system includes: a plurality of data storage devices for storing a plurality of objects of a key-value pair; and a virtual storage layer that applies different data reliability schemes including a data replication scheme and an erasure coding scheme based on a size of an object of the plurality of objects. The plurality of objects includes a first object having a first size and a second object having a second size that is larger than the first size. The virtual storage layer classifies the first object as a small object, applies the data replication scheme, and stores the small object across one or more of the plurality of data storage devices. The virtual storage layer classifies the second object as a huge object, splits the huge object into one or more chunks of a same size, applies the erasure encoding scheme, and distributedly stores the one or more chunks across the plurality of data storage devices.

According to another embodiment, a method for writing an object of a key-value pair includes: receiving a plurality of objects of a key-value pair, wherein the plurality of objects includes a first object having a first size and a second object having a second size that is larger than the first size; classifying the first object as a small object; applying a data replication scheme on the small object; storing the small object across one or more of a plurality of data storage devices; classifying the second object as a huge object; splitting the huge object into one or more chunks of a same size; applying an erasure coding scheme on the huge object; and distributedly storing the one or more chunks across the plurality of data storage devices.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

The figures are not necessarily drawn to scale and elements of similar structures or functions are generally represented by like reference numerals for illustrative purposes throughout the figures. The figures are only intended to facilitate the description of the various embodiments

DETAILED DESCRIPTION

Figure 1:
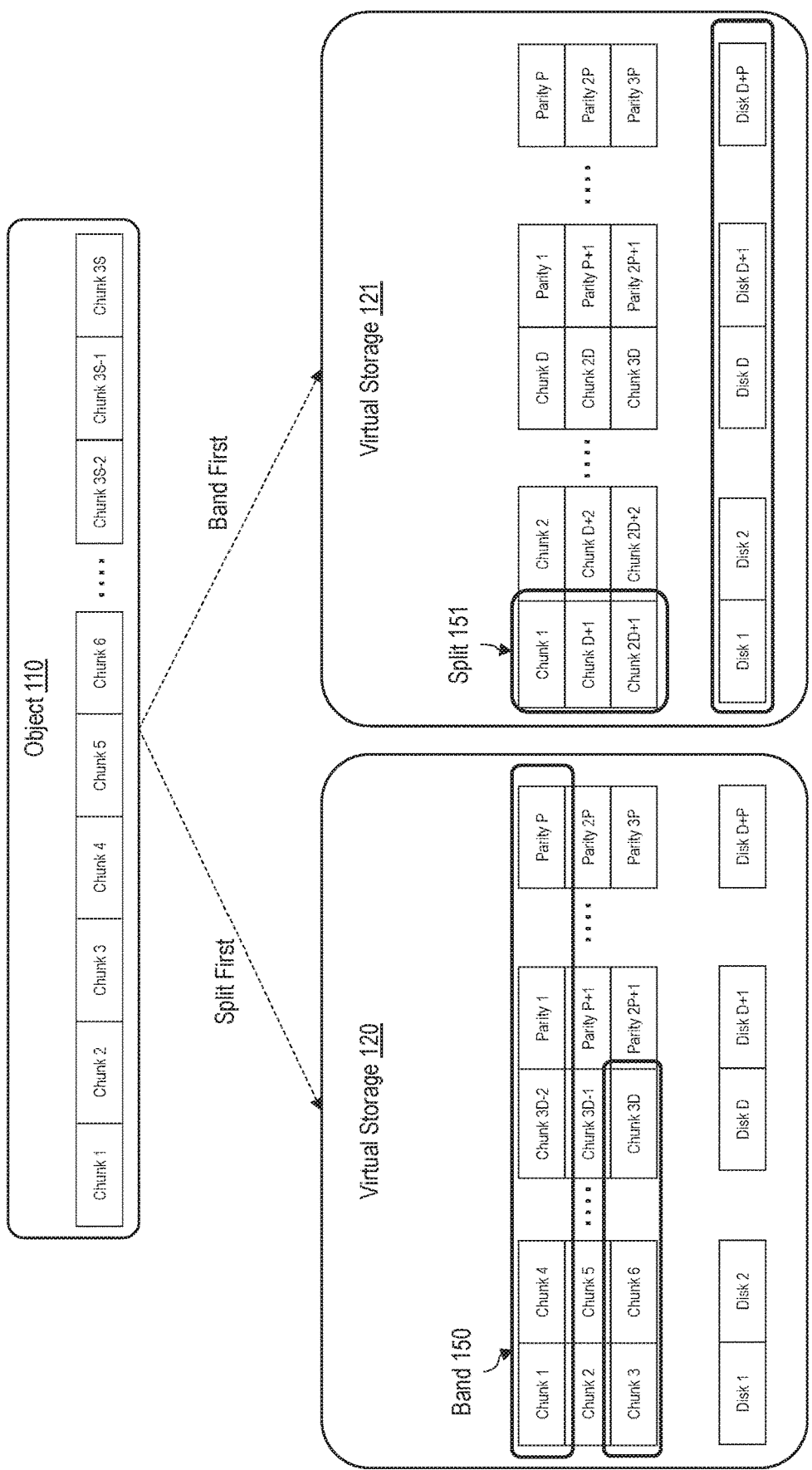
FIG. 1 shows a schematic diagram of an object stored in an example data storage system, according to one embodiment.

Each of the features and teachings disclosed herein can be utilized separately or in conjunction with other features and teachings to provide a data storage system for efficiently storing objects of different sizes and a method of storing the objects in the data storage system. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The present disclosure describes a data storage system and a method for storing large key-value objects in the data storage system. The present data storage system can store data with high reliability in one or more data storage devices. In particular, the present data storage system can store objects differently based on their sizes to reduce the cost and storage space while achieving high reliability. Data associated with a large object can be split into small pieces and stored in one or more data storage devices. Herein, data storage devices may also be referred to as key-value solid state drives (KV SSDs) when data stored therein are a data array associated with key-value pairs.

An object (e.g., a value of a key-value pair) can split into multiple pieces or chunks of the same size. The size of a chunk can be determined on a per-object basis dynamically at runtime. Depending on its size, an object can have a different number and size of chunks.

A group is defined as a set of data storage devices to implement target data reliability. A group can include one or more data storage devices within a box (e.g., a chassis or a rack) or across boxes, and can be structured in a hierarchical or a non-hierarchical manner. For example, The present data storage system includes a virtual storage layer that manages grouping one or more data storage devices and presents a group to a user application as a single virtual storage unit as a whole. The virtual storage layer may be used to manage multiple drivers that control one or more data storage devices. The number of data storage devices that the virtual storage layer manages is configurable based on a reliability target. For erasure coding, the total number of data storage devices may be a sum of data devices (D) and parity devices (P) to tolerate P failures. For replication, the total number of data storage devices that can tolerate P failures may be P+1. The storage capacity of the data storage devices may be roughly similar in erasure coding or replication. The storage capacity of a virtual storage may be determined by the sum of data storage spaces of all data storage devices within the group.

According to one embodiment, the virtual storage layer manages a group of one or more data storage devices in a stateless manner. That is, the virtual storage layer does not, and does not need to, maintain any key information or mapping information between objects and data storage devices. However, the virtual storage layer can cache and maintain essential metadata of the one or more data storage devices such as a number of objects, an available storage capacity, and/or the like dynamically at runtime.

A data storage device such as a KV SSD has implementation-specific constraints on objects and operations on the objects that it can handle. The virtual storage layer of the data storage system may be aware of the minimum and maximum value sizes that each data storage device can support and may determine the minimum and maximum value sizes.

For example, $VMIN_i$ is a minimum value size of the i-th KV SSD. The minimum value size of a virtual storage (VMIN_VS) can be defined by the maximum of all minimum value sizes of individual KV SSDs in the group.

$$VMIN_{VS} = \max_{D+P}(VMIN_i) \qquad \text{Eq. (1)}$$

Similarly, $VMAX_i$ is a maximum value size of the i-th SSD. The maximum value size of virtual storage (VMAX_VS) can be defined by the minimum of all maximum value sizes of individual KV SSD in the group.

$$VMAX_{VS} = \min_{D+P}(VMAX_i) \qquad \text{Eq. (2)}$$

In one example, a maximum distance separable (MDS) algorithm such as Reed-Solomon (RS) code may be used for erasure coding.

According to one embodiment, the present system and method provides a hybrid data reliability mechanism that leverages both replication and erasure coding based on the size of an object. Data replication is fast for small objects and can have a lightweight. However, data replication may consume more storage space for large objects compared to erasure coding. Erasure coding can consume less storage space than data replication for large objects and can reconstruct such large objects by leveraging multiple data storage devices. However, erasure coding typically involves heavy computation and may take longer time to reconstruct small objects since it needs multiple chunks from multiple data storage devices. This is a non-hierarchical approach that replicates data after conducting an erase coding on the data. Instead, the present system and method presents a flexible decision making between data replication and erasure coding based on the size of an object. In other words, the present system and method can decide a data reliability decision, i.e., whether to apply data replication or erase coding at runtime based on the size of an object as well as the total space overhead to store the object.

According to one embodiment, the present system and method does not have a read-modify-write overhead when updating an object. Conventional erasure coding or data replication for block devices has a high penalty when a partial update takes place. If a small piece of data is updated, all the blocks for erasure coding must be read and updated, and the parity blocks must be recalculated and written back to data storage devices after updating. In other words, an update of an object requires a series of read-modify-write processes because a block may be shared with multiple objects. In contrast, the present system and method can provide reliability based on an object and its characteristics, for example, size. If an object is updated, only updated object needs to be overwritten without causing a read-modify-write overhead.

According to one embodiment, the present system and method supports a broad range of object size in a unified framework. If an object is very large (or huge) exceeding a storage capacity limit of a data storage device, the data storage device may not be able to store the object as a whole. In this case, the object needs to be split into small pieces, herein referred to as chunks. The present disclosure discusses how an object can be split into chunks and rebuilt from the split chunks based on the capability of data storage devices. For example, the present system and method provides multiple split and rebuild mechanisms based on a group feature support of the data storage devices, which will be discussed in detail below.

The present system and method provides reliability of objects, not based on a fixed block. Data replication and erase coding can be mixed to implement a target reliability of objects for a single disk group by bifurcating objects based on their size. This approach is different from conventional data reliability technologies that have a hierarchical structure (i.e., replication for erasure coded objects). The present system and method has space efficiency as a primary concern and performance is secondary metrics to determine a reliability mechanism appropriate for a specific object. The storage of objects is stateless. No extra information needs to be stored for either replication or erase coding. No read-modify-write overhead is required for an update regardless of the object size.

Herein, an object refers to static data that has a fixed value during input and output (I/O) operations. An object may be associated with a key of a key-value pair. In this case, the object corresponds to the value of the key-value pair. An object may be split into multiple chunks of the same size, and the size of the chunks may be determined on a per object basis dynamically at runtime. Each object may have a different number and size of chunks when it is saved to one or more data storage devices.

A minimum set of data chunks of an object that is stored all at once across one or more data storage devices (e.g., KV SSDs) without data reliability is herein referred to as a slice. For example, a slice corresponds to the number of chunks of the object that is split one or more data storage devices. A minimum set of data chunks of an object that implements data reliability (e.g., replication or erasure coding) referred to as a band. The number of chunks in a band may be greater than the number of chunks in a slice due to the parity chunks. A set of chunks of an object stored to one data storage device among the one or more data storage devices in a group may be referred to as a split.

A slice may include just one chunk (of the target object) for data replication (i.e., a replicated copy of the original object). For erasure coding, a slice may contain D chunks that comprises the target object. A band, on the other hand, may include one original chunk and P replication chunks for data replication or D data chunks and P parity chunks for erasure coding. The number of slices or bands corresponds to the total number of chunks in a split. The split size (i.e., the number of chunks stored in one data storage device) and the band size (i.e., the number of chunks stored in the one or more data storage devices) may be varied depending on the sizes of the original object and chunks. For example, the split size may be the object size for data replication while the split size is the chunk size multiplied by a chunk count per band for erasure coding.

FIG. 1 shows a schematic diagram of an object stored in an example data storage system, according to one embodiment. An object 110 can be split into a plurality of chunks. For example, the object 110 is split into 3S chunks, Chunk 1 through Chunk 3S, where S is a natural number. It is noted that the total number of chunks 3S is only an example, and the total number of chunks that the object 110 can be any number, and the object 110 does not have to be split into a multiplicity of 3. The object 110 may be classified as a very large or huge object, as will be discussed in more detail below. Those split chunks may be distributed in a virtual storage across one or more data storage devices. In the present example, the virtual storage encompasses D data storage devices (Disk 1 through Disk D) and P parity devices (Disk D+1 through Disk D+P). In the present example, S and D are the same.

According to one embodiment, a virtual storage layer of the data storage system can distribute the chunks in a split-first scheme (split-first distribution) or in a band-first scheme (band-first distribution). In the split-first scheme, the virtual storage layer stores Chunks 1, 2, and 3 in Disk 1, Chunks 4, 5, and in Disk 2 in the virtual storage 120 until Chunks 3D-2, 3D-1, and 3D are stored in Disk D. A band 150 includes data chunks 1, 4 through 3D-2, and parity chunks 1 through P. In the band-first scheme, the virtual storage layer stores Chunks 1 through Chunk D in Disk 1 through Disk D, respectively, Chunks D+1 through 2D in Disk 1 through Disk D in the virtual storage 121 until Chunks 2D+1 through 3D are stored in Disk 1 through Disk D. A split 151 includes data chunks 1, D+1, and 2D+1. Parity chunks, Parity 1 through Parity P are stored in the parity disks, Disk D+1 through D+P. Although it is shown that both the virtual storage 120 and the virtual storage 121 store the parity chunks in a band-first scheme for convenience in the present example, it is understood that the storage of the parity chunks can be done in a split-first scheme without deviating from the scope of the present disclosure.

I/O operations may be executed in a band-first scheme regardless of which chunk distribution methods are used. In this case, I/O operations for Chunk 1, 4 through parity P are stored in parallel even for the split-first scheme.

According to one embodiment, erasure coding is applied to an object based on its size. For an $i_{th}$ object $O_i$ having a size $SZ_{O_i}$, the number of chunks per device, i.e., a split, ($NC_{O_i}$) is defined by Equation 3 below. For replication, the number of chunks per device may be 1 (i.e., $NC_{O_i}=1$).

$$NC_{O_i} = ceil\left(\frac{ceil\left(\frac{SZ_{O_i}}{D}\right) + SZ_{meta}}{VMAX_{VS}}\right) \quad \text{Eq. (3)}$$

The number of chunks per device $NC_{O_i}$ is the minimum number of chunks per split to store the object $O_1$ across the data disks (i.e., data storage devices referred to as Disk 1 through Disk D) when the maximum chunk size ($VMAX_{VS}$) is used. If the object size is not aligned to the allocation or alignment unit of a data storage device, an extra space allocated for the object in a band may be padded with zeros.

If the maximum chunk size is used, it tends to waste a storage space with too much padding. Therefore, the actual chunk size of the object $O_i$ is determined more tightly by Equation 4. $SZ_{meta}$ is the metadata size if additional metadata is stored with data per chunk. If the data storage devices support a group feature, some metadata such as a group identifier (ID) and the total number of chunks may be stored in each chunk. If the data storage devices do not support a group feature, no metadata is stored (i.e., $SZ_{meta}=0$). For replication, the actual chunk size may be equal to its original object size (i.e., $C_{O_i}=SZ_{O_i}$).

$$C_{O_i} = \begin{cases} \text{if } \hat{C}_{O_1} < VMIN_{VS}, & VMIN_{VS} \\ \text{Otherwise}, & \hat{C}_{O_1} \end{cases} \quad \text{Eq. (4)}$$

$$\text{where } \hat{C}_{O_1} = ceil\left(\frac{SZ_{O_i} + SZ_{meta} * D * NC_{O_i}}{D * NC_{O_i}}\right)$$

Equation 4 determines the chunk size that ranges between $VMIN_{VS}$ and $VMAX_{VS}$ but close to $VMAX_{VS}$. The chunk size that is determined by Equation 4 can minimize the number of I/O operations while maximizing the I/O bandwidth. Then, the amount of data that each data storage device stores, i.e., a split size, is defined by Equation 5.

$$S_{O_i} = C_{O_i} * NC_{O_i} \quad \text{Eq. (5)}$$

Finally, the total amount of data written across the data storage devices at one time, i.e., a band size, is defined by Equation 6. For replication, D may be equal to 1.

$$B_{O_i} = C_{O_i} * (D+P) \quad \text{Eq. (6)}$$

As described above, data storage devices can have limitations on the size of objects that they can store. Some data storage devices may not be able to support very large objects or very small objects. To achieve reliable and efficient storage of objects having different sizes, the present data storage system employs different data reliability schemes based on the size of an object to store. According to one embodiment, the virtual storage layer of the present data storage system can categorize objects based on their size into four types, namely, huge, large, medium, and small. An object is classified as being huge if multiple bands are used to store the object. An object is classified as being large if one band is almost fully used to store the object. An object is classified as being small if only a small fraction of a band is used to store the object. Finally, an object is classified as being medium if it can be categorized as small or large. Therefore, chunks of different sizes can coexist not only in the same virtual storage but also in individual data storage devices that form the virtual storage.

An object is classified as being small if the space overhead of replication for the object is smaller than that of erasure coding for the object. In this case, replication is preferred since it provides better performance for read and can handle updates better than a complex erasure coding scheme. This is also reasonable from the observations that application metadata tends to be small. In one embodiment, a small object $O_i$ having a $SZ_{O_i}$ satisfies the following inequality:

$$(P+1)*SZ_{O_i} \leq (D+P)*V\,MIN_{VS} \quad \text{Eq. (7)}$$

An object is classified as being large if the space overhead of erasure coding for the object is smaller than that of data replication for the object. In this case, erasure coding is preferred since it has a less space footprint. Specifically, a large object satisfies the following inequality:

$$D*V\,MAX_{VS} \geq SZ_{O_i} \geq D*V\,MIN_{VS} \quad \text{Eq. (8)}$$

A large object can be structured similarly to FIG. 1, but it can have only one band or one chunk within a split.

An object is classified as being huge if an object has more than one chunks within a split. In this case, erasure coding is preferred. Specifically, a huge object satisfies the following inequality:

$$SZ_{O_i} > D*V\,MAX_{VS} \quad \text{Eq. (9)}$$

A huge object can be structured similarly to FIG. 1, and it can have multiple bands or more than one chunks within a split.

There may be a range of an object size that can be classified as either small or large. An object that satisfies the following inequality is classified as being medium:

$$((P+1)*SZ_{O_i} > (D+P)*V\,MIN_{VS} > D*V\,MIN_{VS} > SZ_{O_i}) \quad \text{Eq. (10)}$$

In such case, either data replication or erase coding can be used. If performance is more important, and objects are updated frequently, data replication may be a better choice. In this case, medium objects may be classified as being small. If space efficiency is more important, erase coding can be used. In such case, medium objects may be classified as being large.

The virtual storage layer may need to split a huge object into small data chunks to store the object and then reconstruct the object with the split data chunks to retrieve the huge object. For this purpose, an internal key that is generated from a user (e.g., a user application running on a host computer) key may be used to make the virtual storage layer stateless. According to one embodiment, the virtual storage layer reserves a few bytes of a device-supported key space for an internal use for distributing chunks and exposes the remaining portion of the key space to a user. In this case, a user-specified object key represents a group of internal keys for the one or more split chunks of an object.

Figure 2:
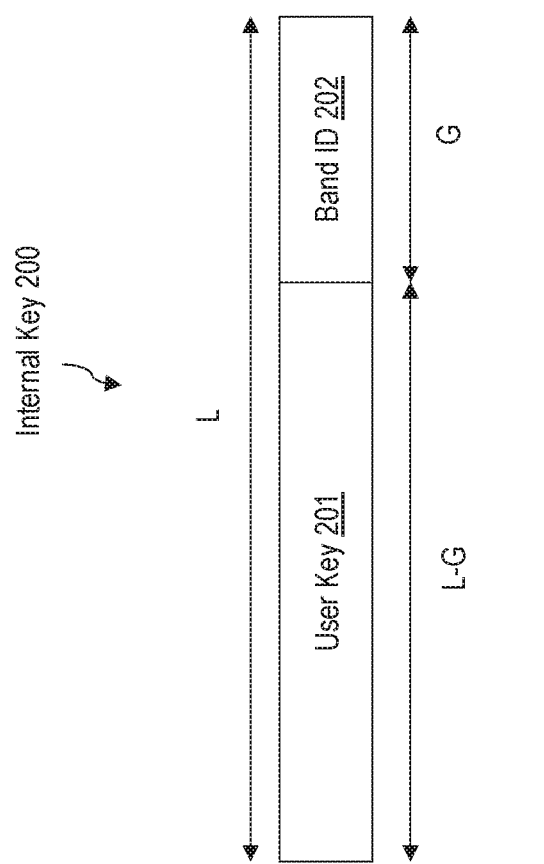
FIG. 2 shows an example user key including an internal key, according to one embodiment.

FIG. 2 shows an example user key including an internal key, according to one embodiment. An internal key 200 includes a first portion of a user key 201 and a second portion of a band identifier (ID) 202. The internal key 200 can be used to identify the entire group of chunks or a portion of chunks for the corresponding object. In this case, the object corresponds to a value of a key-value pair including the internal key 200 as a key of the key-value pair. In the present example, the maximum key length that the virtual storage layer and/or a data storage device supports is L, and the number of bytes that is reserved for the group specification is G. The virtual storage layer advertises that the maximum key length that a user can use is L-G.

For a small or large object, the G bytes of the band ID 202 may be padded with 0 by default. For a huge object, the virtual storage layer may calculate the number of bands for the object. Individual bands may be identified using the internal key 201. A band may be written to one or more data storage devices assigned for storing the object one by one according to a split-first or band-first scheme.

According to one embodiment, a data storage device can support a group feature. The virtual storage layer can identify a split stored in a data storage device by specifying a group based on the user key 201. In this case, additional metadata may not be needed (SZ_meta=0). The virtual storage layer can retrieve all chunks for an object by broadcasting the user key 201 and the band ID 202 filled with "don't care" bits (bits of arbitrary data, e.g., 0xFF) to all data storage devices. If the band ID is "don't care", the band ID field is ignored. It may be assumed that a data storage device implements a group feature efficiently. For example, a trie structure can easily identify objects with a given prefix of the user key 201 while a hash table can find objects in a hash bucket using a user key only if metadata fields are fixed. The virtual storage layer may sort the returned object chunks based on the band ID 202 per device in an ascending order, reconstructs the bands and then the object, and returns the object with the user key 201.

Figure 3:
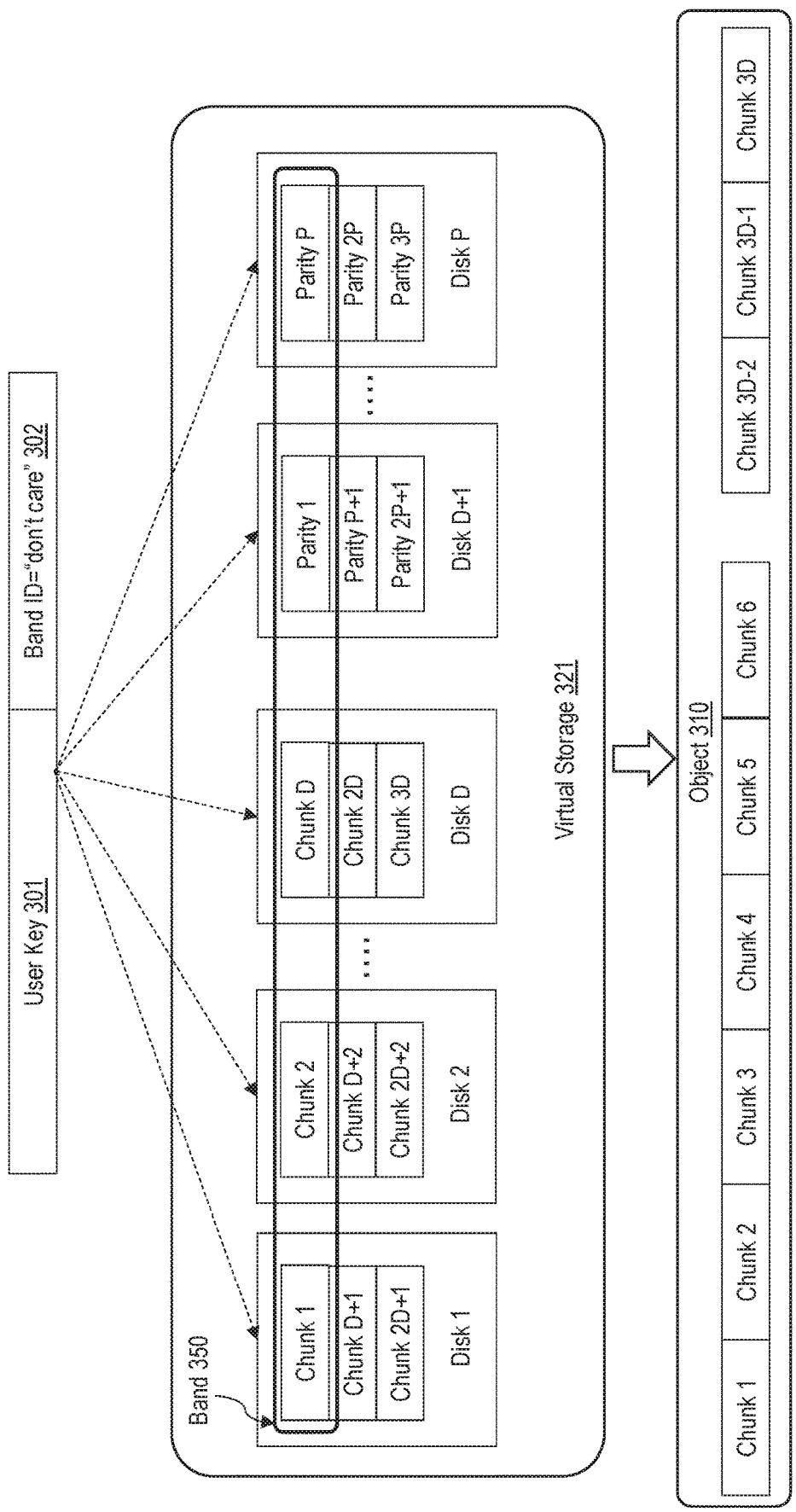
FIG. 3 shows an example of object retrieval using a group feature, according to one embodiment.

FIG. 3 shows an example of object retrieval using a group feature, according to one embodiment. Each of disks, i.e., Disk 1 through D, and Disk D+1 through P, the data storage devices assigned to store an object supports a group feature. In this case, the band ID 302 is set to "don't care," indicating to ignore the band ID 302. The virtual storage layer collects chunks (i.e., data chunks 1, 2, . . . , parity chunks 1 through P) that belong to Band 350 using the user key 301 and reconstructs the first slice including Chunks 1 through D from the Band 350. Then, the virtual storage layer collects the remaining chunks and reconstructs the remaining slices in order. Once all slices are built, the virtual storage layer reconstructs the object 310 including data Chunks 1 through 3D from the slices. In the case of erasure coding, the virtual storage layer further reconstructs the parity block(s) from the parity chunks 1 through P. The present example shows a split-first scheme for distributing the chunks; however, it is understood that a band-first scheme can be applied to the chunk distribution and object retrieval without deviating from the scope of the present disclosure.

Figure 4:
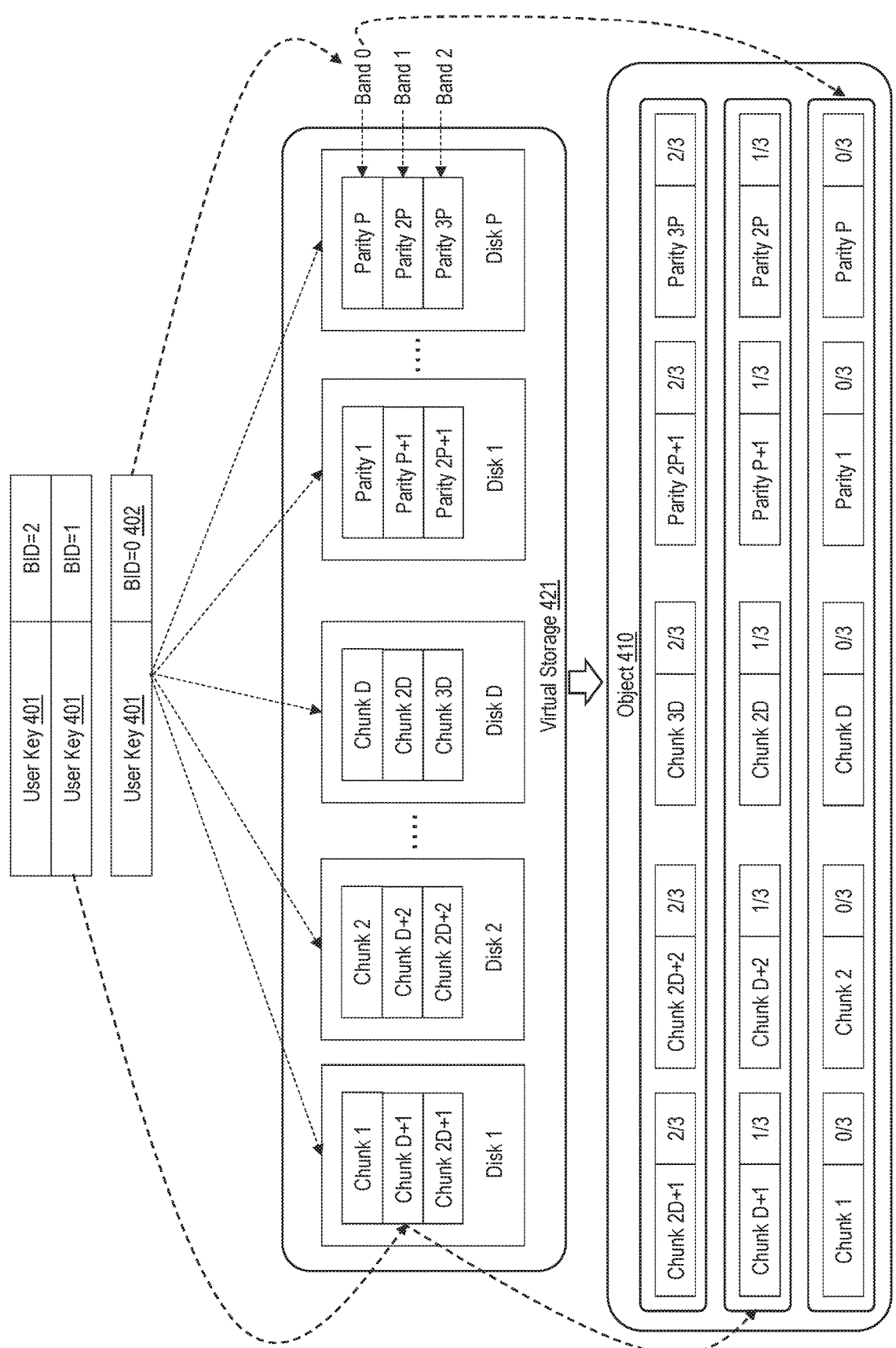
FIG. 4 shows an example of object retrieval without a group feature, according to one embodiment.

FIG. 4 shows an example of object retrieval without a group feature, according to one embodiment. In this case, the virtual storage layer appends additional metadata to a large or huge object (i.e., SZ_meta≠0) because the data storage devices that are assigned to store the object do not support a group feature. Each chunk may be identified by a band ID 402 having a 1-byte length. In the present example, there are three bands, Band 0, 1, and 2 such that the number of bands may fit in the 1-byte length. The virtual storage layer can build slices one by one using the band ID 402. First, the virtual storage layer broadcasts the user key 401 with a band ID that is equal to 0 (BID=0) to all data storage devices. The virtual storage layer receives chunks for Band 0 from the data storage devices, and retrieves the band information from a chunk from the received chunks that belong to Band 0. Based on the received band information, the virtual storage layer knows the number of bands to retrieve the object. If the object is large, there may be only one band, so the virtual storage layer can reconstruct the entire object from the chunks in the band. If there are more than one bands for a huge object, the virtual storage layer needs to retrieve more bands (e.g., Band 1 and Band 2) one by one. In this case, the virtual storage layer broadcasts retrieval requests by adjusting the band ID (e.g., BID=1 or BID=2) until it retrieves all chunks. Once the virtual storage layer builds all slices, the virtual storage layer can reconstruct the object 410. It is noted that a small object may not have metadata regardless of whether devices support group feature or not. By checking the chunk size, the virtual storage layer may determine whether the object 410 is small or not using the inequalities (7) and (10).

For writing a huge object to one or more data storage devices, the huge object may be split into $NC_{O_i}*D$ chunks of same size, i.e., $NC_{O_i}$ slices. The last data chunk (e.g., Data 4a of the object 510a and Data 4b of the object 510b in FIG. 5) may be padded with zero considering the alignment requirements, and P parity chunks may be generated from the D data chunks per slice.

Figure 5:
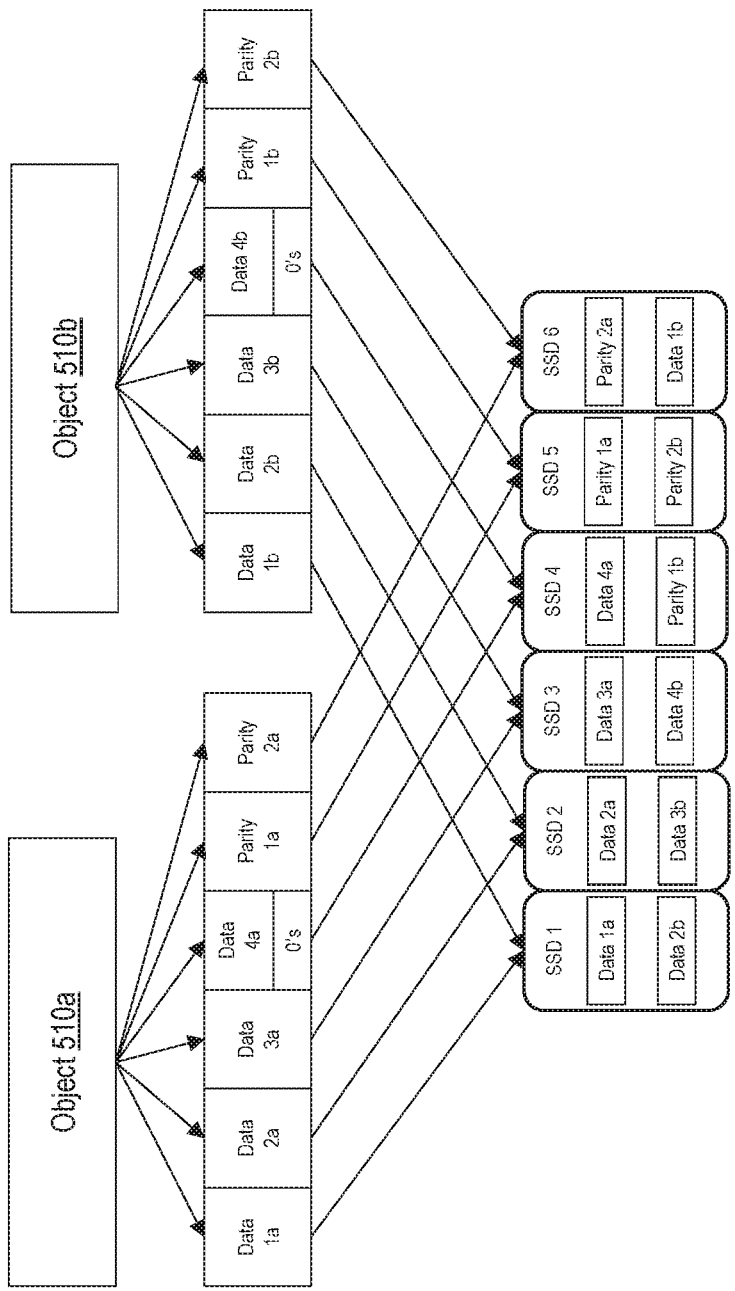
FIG. 5 show an example of erasure coding without a dedicated parity device, according to one embodiment.
Figure 6:
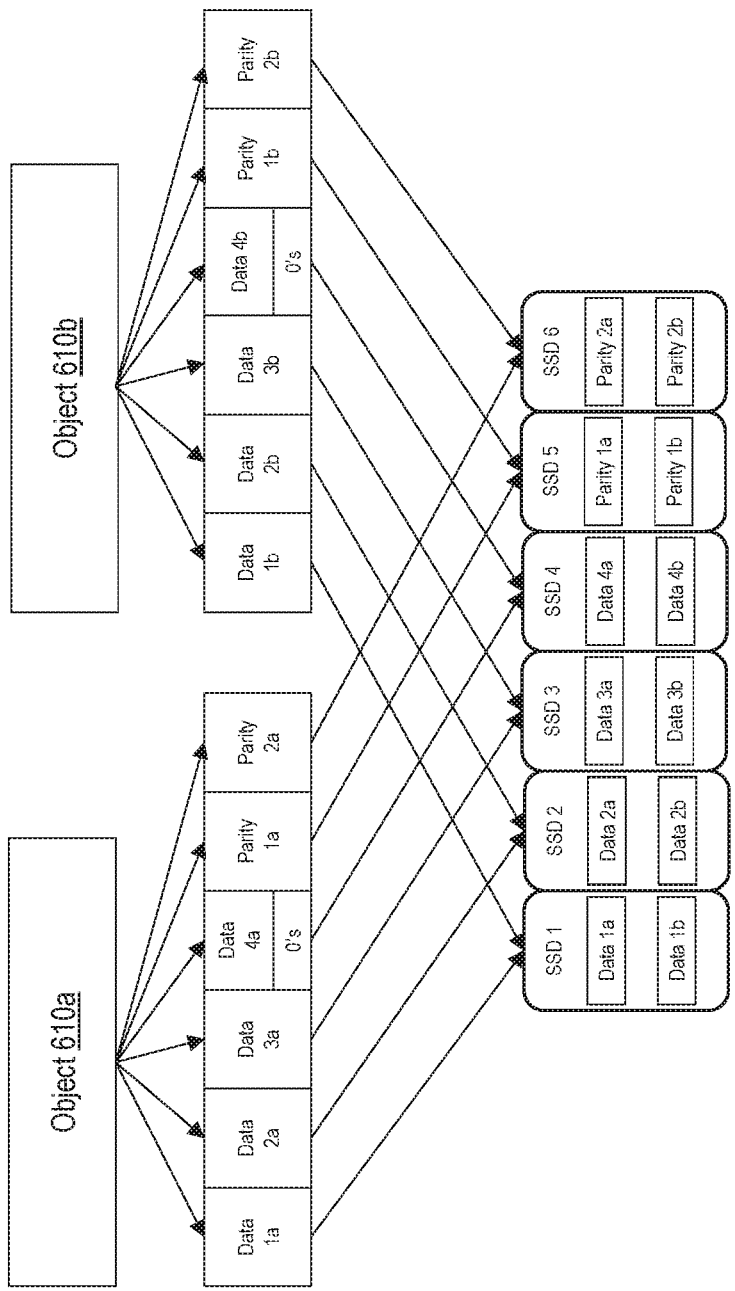
FIG. 6 show an example of erasure coding with one or more dedicated parity devices, according to one embodiment.

FIG. 5 show an example of erasure coding without a dedicated parity device, according to one embodiment. FIG. 6 show an example of erasure coding with one or more dedicated parity devices, according to one embodiment. The total of (D+P) chunks including D data chunks and P parity chunks per each band are distributed over one or more data storage devices such that all $NC_{O_i}$ bands are written. The parity chunks can be distributed over D+P devices (e.g., SSD 4 through SSD 6 in FIG. 5) or can be stored on P dedicated devices (e.g., SSD 5 and SSD 6 in FIG. 6). The primary data storage device can be selected using a hash value of a user key (represented as "Hash(user key)" below) without a band ID over data storage devices. All or a subset of the (D+P) devices may be selected in the example of FIG. 5, and D devices may be selected in the example of FIG. 6. The start device can be determined by Hash(user key)%(D+P) if there is no dedicated parity device, or by Hash(user key)%D if there are dedicated parity devices. The subsequent chunks can be sequentially written to the next devices, for example, (Hash(user key)+1)%(D+P), (Hash(user key)+2)% (D+P), . . . , (Hash(user key)+D+P−1)%(D+P) or (Hash(user key)+1)%D, (Hash(user key)+2)%D, . . . , (Hash(user key)+ D−1)%D. This operation is per band, and the virtual storage layer repeats this procedure for all $NC_{O_i}$ bands for writing the chunks of the object. The hash value of the user key may need to be calculated one time per each object.

If the data storage devices do not support a group feature, chunks have additional metadata for the band ID and the total number of bands as shown in FIG. 4. The number of bands may be determined by Equation (3). The chunks in a band may have a pair of (band ID, $NC_{O_i}$) as metadata.

Referring to FIG. 5, the virtual storage layer stores the data chunks (Data 1a through 4a) and parity chunks (Parity 1a and 2a) of an object 510a across the data storage devices SSD1 through SSD 6. The virtual storage layer stores the data chunks (Data 1b through 4b) and parity chunks (Parity 1b and 2b) of another object 510b across the data storage devices SSD1 through SSD 6. The start device (e.g., SSD1 for the object 510a and SSD6 for the object 510b) may be determined by a hash value of a user key as discussed above. Because there is no dedicated parity device, the virtual storage layer may distribute the data chunks and parity chunks across the data storage devices SSD1 through SSD6 without distinguishing data chunks and parity chunks. In the present example, SSD4 and SSD 6 include both data chunk and parity chunk.

Referring to FIG. 6, the virtual storage layer stores the data chunks (Data 1a through 4a) and parity chunks (Parity 1a and 2a) of an object 510a across the data storage devices SSD1 through SSD 6. Similarly, the virtual storage layer stores the data chunks (Data 1b through 4b) and parity chunks (Parity 1b and 2b) of the object 510b across the data storage devices SSD1 through SSD 6. Because the SSD5 and SSD6 are assigned as parity devices, SSD5 and SSD 6 include only parity chunks.

For writing a large object to one or more data storage devices, the large object may be split into $NC_{O_i}*D$ chunks of same size. The large object may be handled similarly to a huge object except that there may be only one band for the object, i.e., $NC_{O_i}=1$.

For storing a small object, (P+1) replication objects may be created for the object. Considering alignment with padding, and the replication objects may be distributed over (P+1) devices. The primary device can be selected using a hash value of a user key over the (D+P) devices. P replication objects may be deterministically selected based on various factors such as storage organization, performance, etc. For example, the replication objects can be simply stored on (Hash(key)+1)%(D+P), (Hash(key)+2)%(D+P), . . . , (Hash(key)+P)%(D+P), or on different node, racks regardless if there is no dedicated parity device. If there are dedicated parity devices or nodes, the replication objects can be stored on (Hash(key)+1)%D, (Hash(key)+2)%D, . . . , (Hash(key)+P)%D. Regardless of device capability, small objects may not have metadata.

Figure 7:
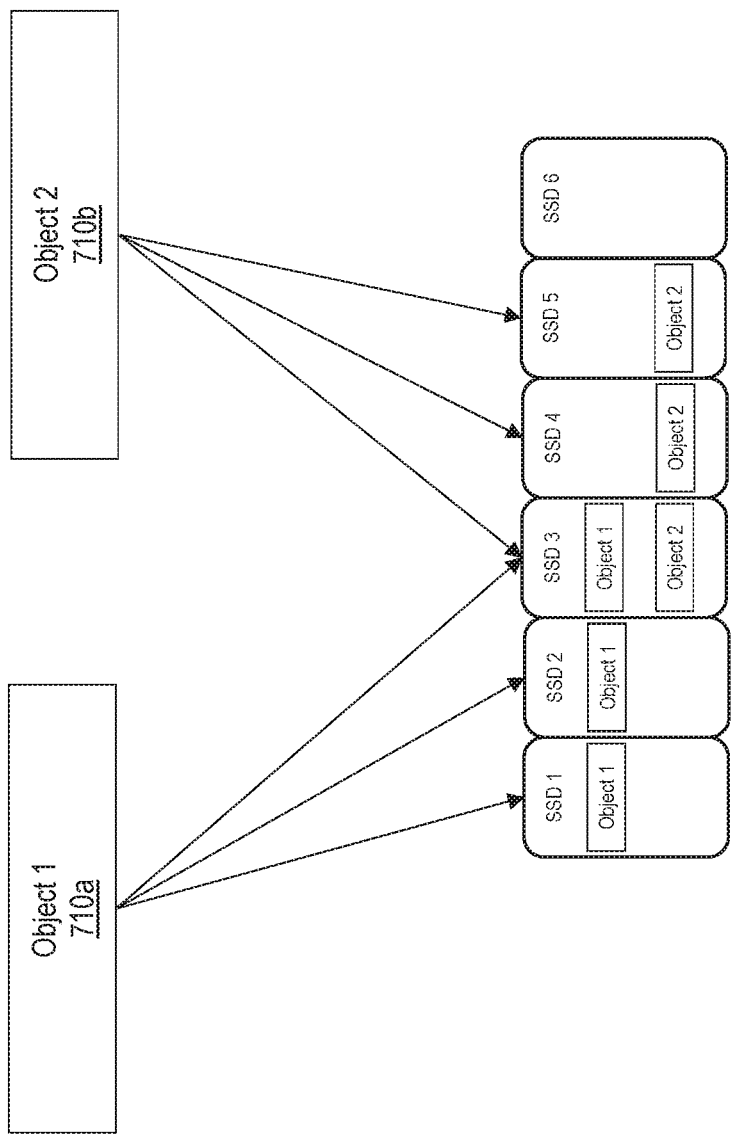
FIG. 7 shows an example replication scheme of a small object across one or more data storage devices with no parity device, according to one embodiment.

FIG. 7 shows an example replication scheme of a small object across one or more data storage devices with no parity device, according to one embodiment. The virtual storage layer may store the small object 710a (object 1) across the data storage devices SSD1, SSD2, and SSD3. The virtual storage layer may store the small object 710b (object 2) chunks across the data storage devices SSD3, SSD4, and SSD5. It is noted that the small objects 710a and 710b are not split into smaller data chunks. The start devices for storing objects 710a and 710 may be determined by the hash value of the corresponding user key. In the present example, the starting device for the object 710a is SSD1, while the starting device for the object 710b is SSD3. In the present example, the total number of replication objects is (P+1) for each of the objects 710a and 710b is 3 (i.e., P=2).

Figure 8:
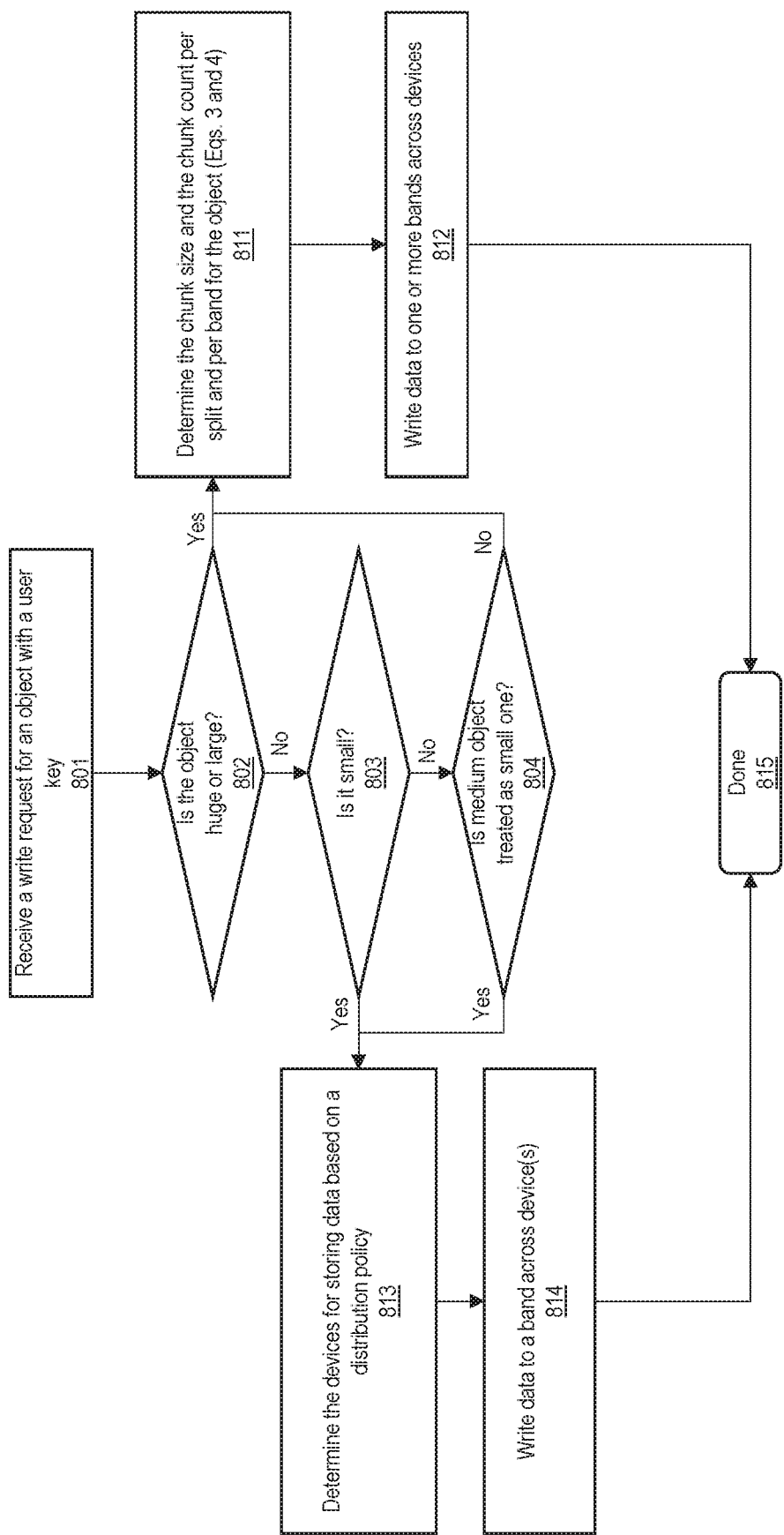
FIG. 8 shows an example flowchart for writing an object, according to one embodiment.
Figure 8:
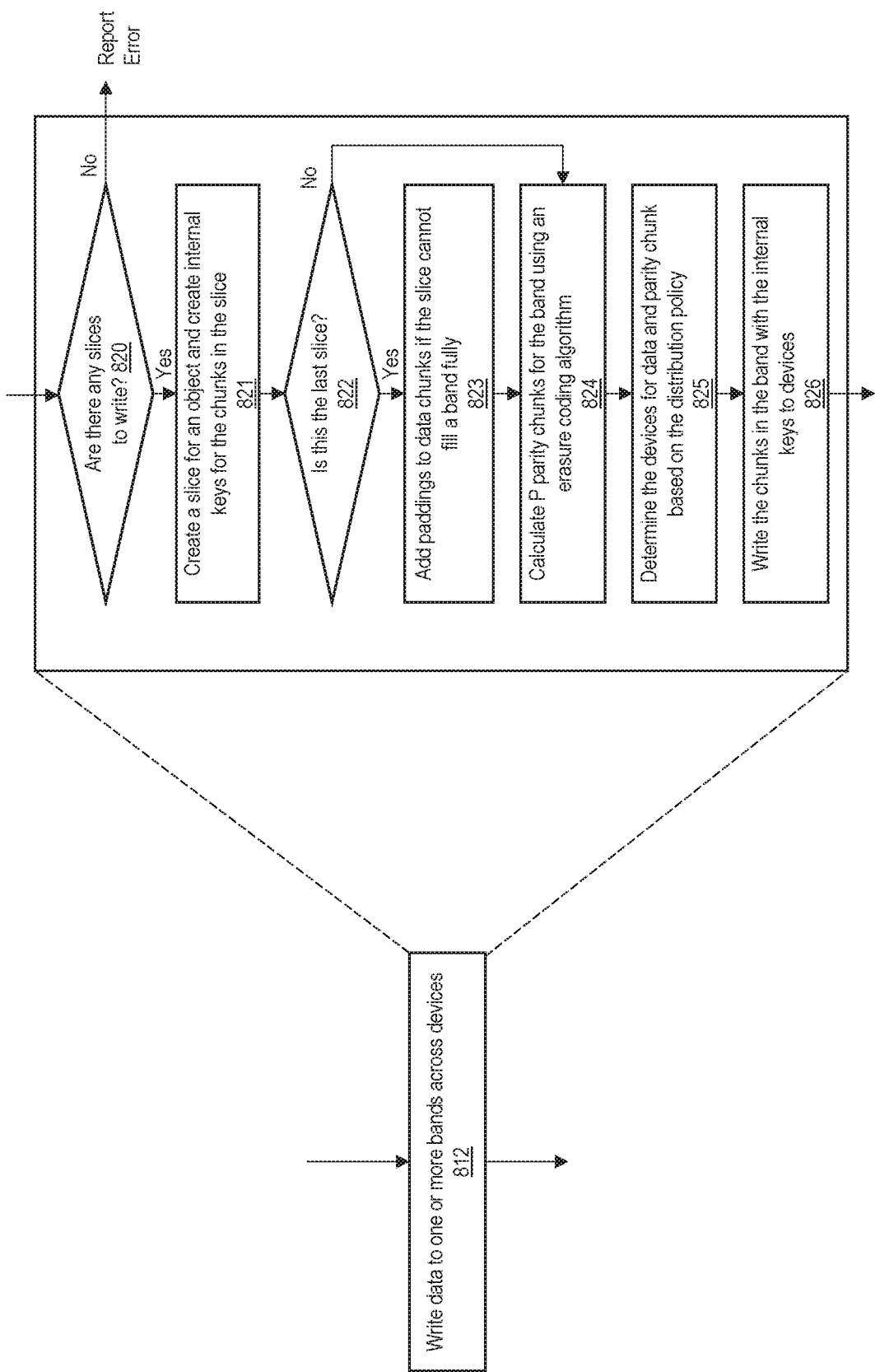

FIG. 8 shows an example flowchart for writing an object, according to one embodiment. A virtual storage layer of a data storage system receives a write request to write an object (801). The write request received from a user (or a user application running on a host computer) may include a user key. The virtual storage layer determines whether the object is huge or large, for example, using the Inequalities (8) and (9) (802). For a large or huge object, the virtual storage layer determines a chunk size and a chunk count per split and per band, for example, using Equations (3) and (4) (811), and writes data to the one or more bands across data storage devices (812), and completes the writing process (815).

If the virtual storage layer determines that the object is neither large nor huge, the virtual storage layer further determines if the object is small (803), for example, using the Equation (7). For a small object, the virtual storage layer determines one or more data storage devices for storing data including the original data and replication data based on a distribution policy (813), writes the data across one or more devices in a band (814), and completes the write process (815). For example, the virtual storage layer may employ a band-first policy (distributing the data across multiple data storage devices). The virtual storage layer may determine a start device using a hash value of the user key.

If the virtual storage layer determines that the object is neither huge, large, nor small, the virtual storage layer treats the object as medium (804), determines one or more data storage devices for storing data including the original data and replication data based on a distribution policy (813), writes the data across one or more devices in a band (814), and completes the writing process (815).

The process 812 of writing data to the one or more bands across data storage devices may include several subprocesses. First, the virtual storage layer determines whether there are any slices to write (820). If there is no slice to write, the virtual storage layer saves an error log, terminate the operation, and inform the user application running on a host computer that sent the request to write the object and/or the operating system of the host computer. The virtual storage layer creates a slice for an object and creates internal keys for the chunks in the slice (821). The virtual storage layer checks if this is the last slice to write (822). For the last slice, the virtual storage layer may add paddings to data chunks if the slice cannot fill a band fully (823), and calculates P parity chunks for the band using an erasure coding algorithm (824). For the slices other than the last slice, the virtual storage layer may skip the padding process 823. The virtual storage layer further determines the devices for data and parity chunks based on a distribution policy (825). For example, the distribution policy may be either a split-first or a band-first policy. The virtual storage layer writes the data and parity chunks in the band with the internal keys generated in 821 to the one or more data storage devices (826).

The virtual device layer may not know whether the object to read is small, large, or huge because it does not maintain object metadata such as a user key and a value size. Therefore, the virtual device layer broadcasts a read request to all data storage devices (e.g., (D+P) data storage devices) in a virtual storage using the user key of the object and determines an appropriate way to reconstruct the object based on classification of the object size. Depending on a group feature support by the data storage devices, the virtual storage layer can process read and write operations differently.

A huge object may be read differently based on the support of a group feature by the data storage device. If data storage devices in the virtual storage support a group feature, the virtual storage layer broadcasts a user key with BID="don't care" to all data storage devices. In response, each of the (D+P) data storage devices returns $NC_{O_i}$ chunks in its split if there is no error in the response to the broadcast. The virtual storage layer then categorizes the received chunks into the total of $NC_{O_i}$ bands per their band ID, and sorts the bands in an ascending order of the band ID. As long as the virtual device layer receives any D chunks of the same size per each band, the virtual device layer is capable of rebuilding the band. If the total number of received chunks for a band is smaller than the number of data storage devices D or the sizes of chunks are not same, an error occurs. The error may be caused by a read of a non-existing object in the case that all data storage devices return a NOT_EXIST error, or an unrecoverable error. The virtual storage layer reconstructs the bands one by one, and then the object from the bands.

If the data storage devices in the virtual storage do not support a group feature, the virtual storage layer broadcasts a user key with BID=0 to all data storage devices to read the huge object. In response, each of the (D+P) da storage devices returns one chunk in the first band (Band 0). The virtual storage layer may identify the number of bands for the object by checking the metadata stored with any of the received chunks. The virtual storage layer then reconstructs all bands one by one in an ascending order of the band ID, and reconstruct the object using the bands. In some embodiments, the virtual storage layer can reconstruct an object similar to the group supported case by requesting all remaining bands asynchronously.

The process of reading of a large object may be similar to that of a huge object except that it has only one band. If the data storage devices support a group feature, the virtual storage layer broadcasts a user key with BID="don't care" to all data storage devices. In response, each of the (D+P) data storage devices returns one chunk in its split. As long as the virtual device layer receives D chunks of the same size, the virtual device layer can rebuild the object. If the total number of received chunks for the band is smaller than the number of data chunks D or the size of chunks is not the same, an error occurs. The error may be caused by a read of a non-existing object in the case that all the data storage devices return a NOT_EXIST error, or an unrecoverable error.

If the data storage devices in the virtual storage do not support a group feature, the virtual storage layer broadcasts a user key with BID=0 to all the data storage devices to read the large object. In response, each of the (D+P) data storage devices returns one chunk in the band (BID=0). The virtual storage layer identifies that only one band exists for the large object by checking the metadata stored with any received chunks and reconstructs the object by rebuilding the band.

The process of reading of a small object may be similar to that of a large object except that it relies on replication. If the data storage devices support a group feature, the virtual storage layer broadcasts a user key with BID="don't care" to all the data storage devices. In response, each of the (D+P) data storage devices returns a response. Since the object is small, some data storage devices may return an error of NOT_EXIST while other data storage devices return a chunk. The virtual device layer receives any valid chunks can rebuild the object using the chunks received from one or more data storage devices. If all data storage devices return a NOT_EXIST error, the object identified by the read request may be a non-existing object, or an unrecoverable error may occur.

If the data storage devices in the virtual storage do not support a group feature, the virtual storage layer broadcasts a user key with BID=0 to all data storage devices to read the small object. In response, each of the (D+P) data storage devices returns a response. The virtual storage layer can identify that the object is small using any valid chunk received from any data storage device. It is noted that a small object does not maintain an additional metadata.

Figure 9:
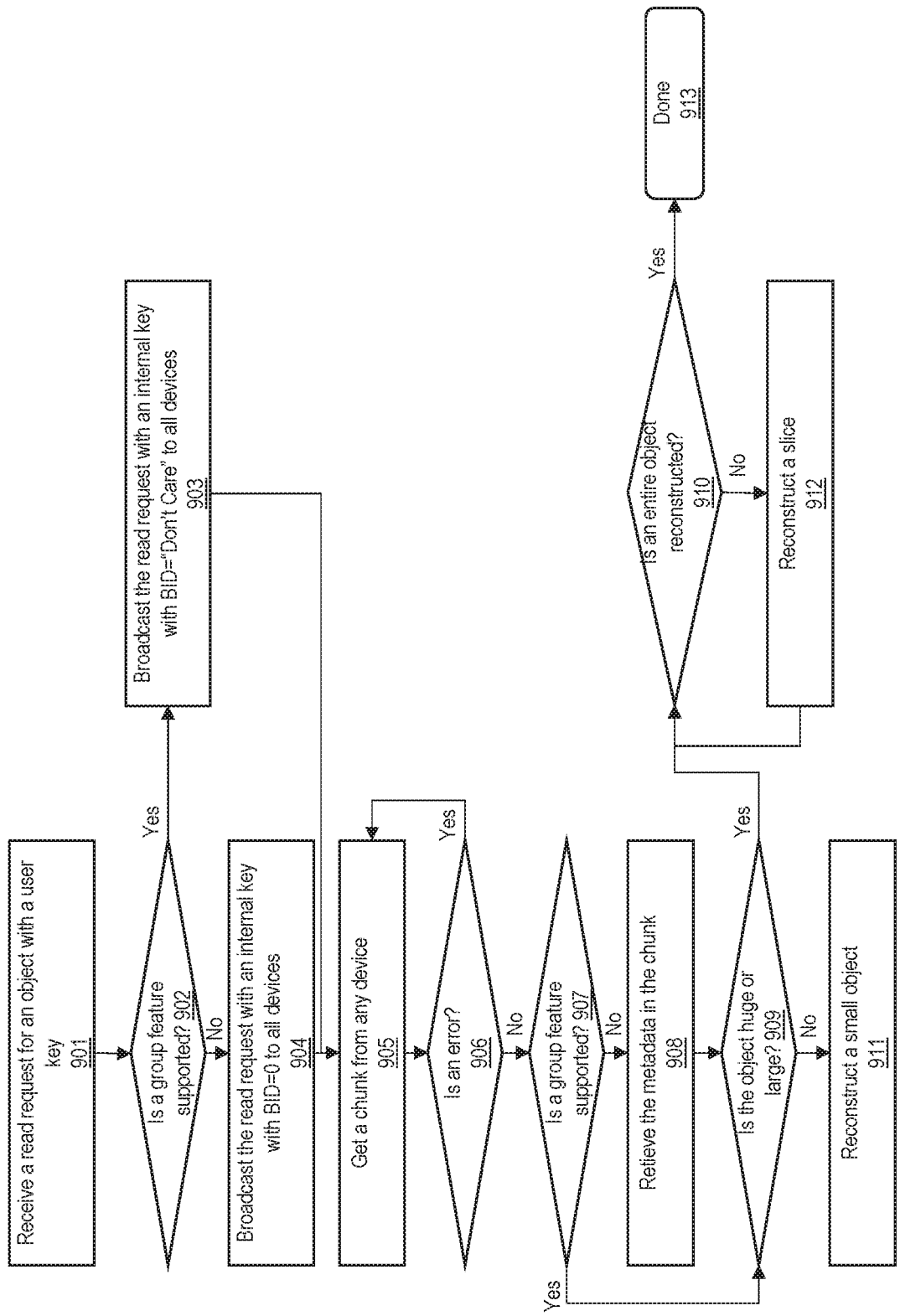
FIG. 9 shows an example flowchart for reading an object, according to one embodiment.
Figure 9:
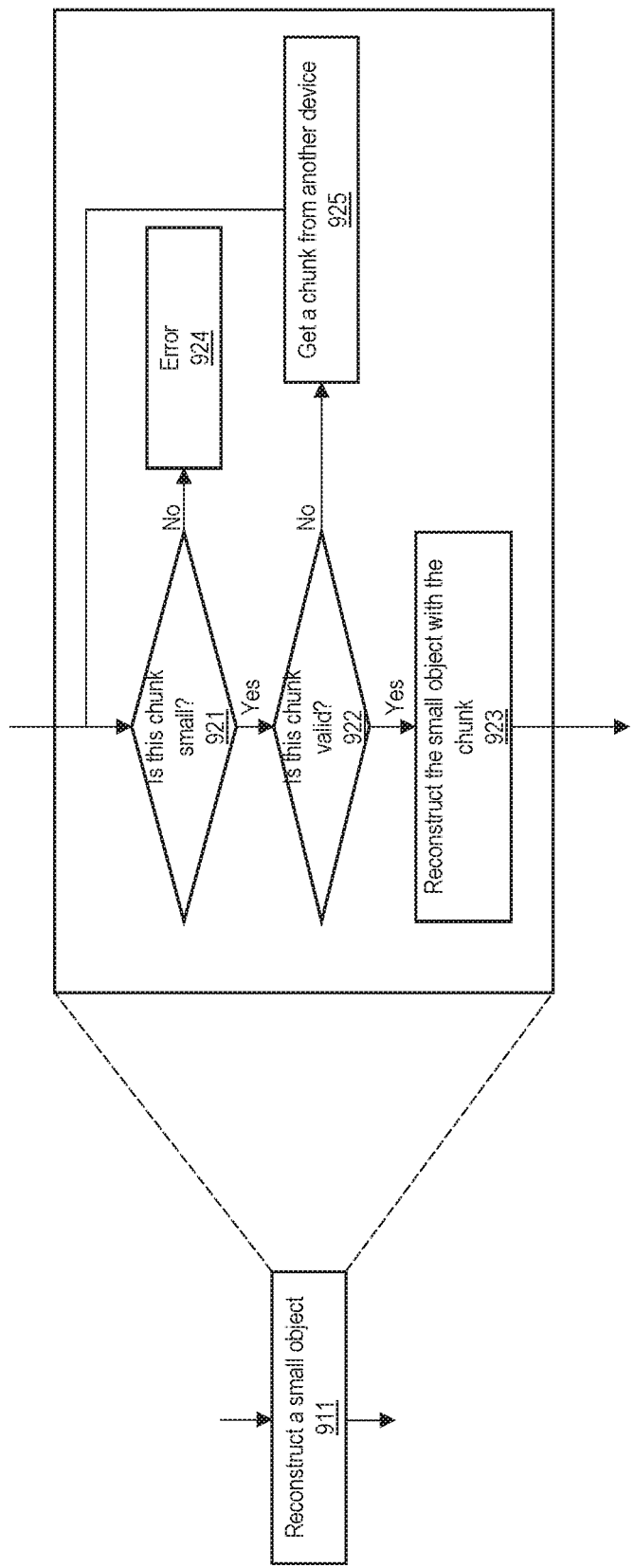
Figure 9:
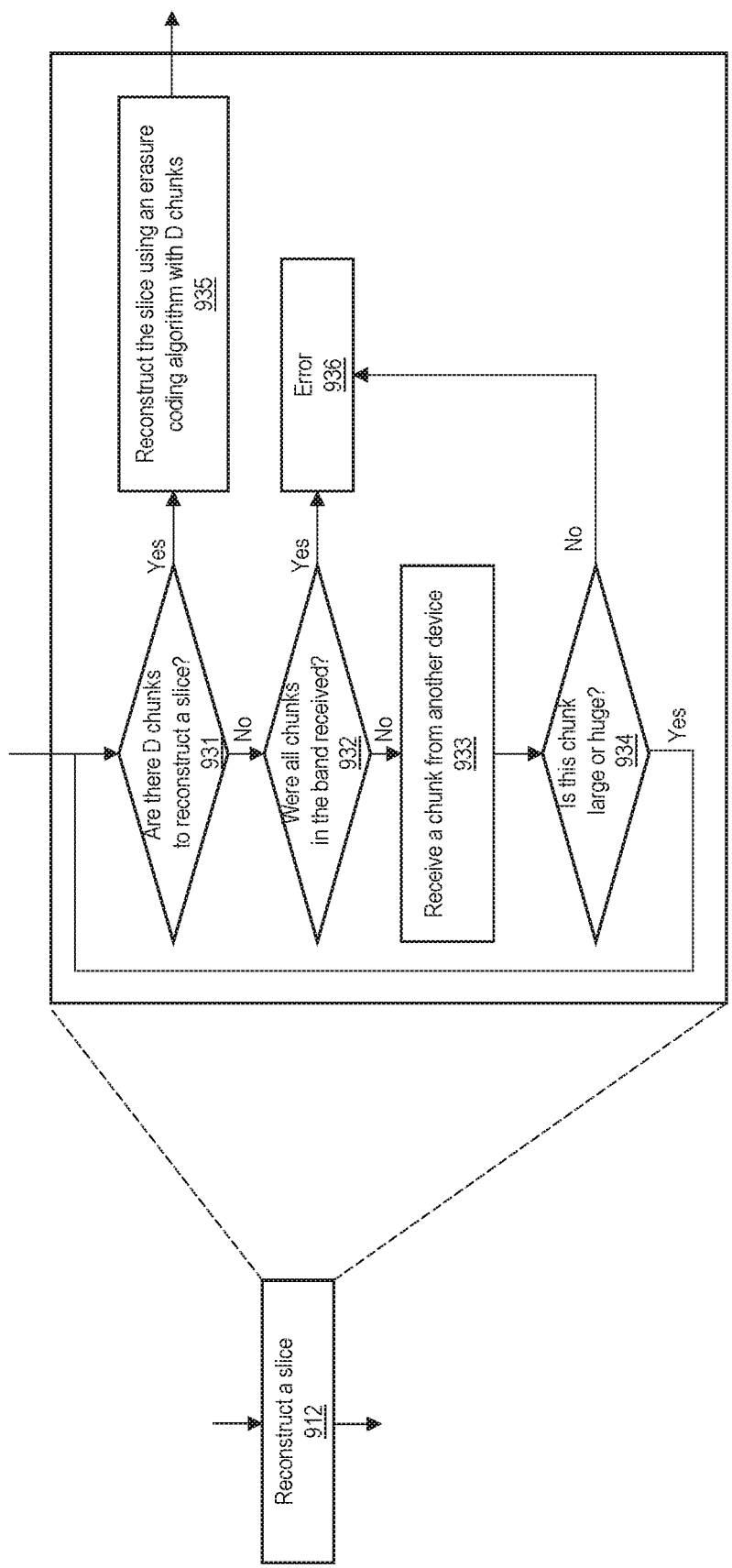

FIG. 9 shows an example flowchart for read an object, according to one embodiment. The virtual storage layer receives a read request for an object (901). The read request received from a user (or a user application running on a host computer) may include a user key. The virtual storage layer determines if a group feature is supported by the one or more data storage devices that stores one or more chunks of the object (902). If the group feature is supported, the virtual storage layer broadcasts the read request with an internal key with BID="don't care" to all data storage devices (903), otherwise, set the BID=0 to all data storage devices (904). The virtual storage layer receives a chunk from one of the data storage devices (905). If there is no error in the received chunk (906), the virtual storage layer determines if the group feature is supported (907) and retrieves metadata in the chunk (908), otherwise, the virtual storage layer continues to determine a size of the object.

If the virtual storage layer determines that the object is huge or large (909), the virtual storage layer further checks if an entire object is reconstructed (910), continues to reconstruct a slice one by one until the entire object is reconstructed using the chunks received from one or more data storage devices (912), and completes the read process (913). For a small object, the virtual storage layer reconstructs the object using the received chunks from one or more data storage devices (911).

The process 911 of reconstructing a small object may include several subprocesses. The virtual storage layer first checks if the received chunk is small (921). When the virtual storage layer expects a small chunk for the small object, but receives a large chunk, the virtual storage layer generates an error (924). If the virtual storage layer determines that the received chunk is valid (922), the virtual storage layer reconstructs the small object with the received chunk(s) (923), otherwise, the virtual storage layer receives a chunk from another data storage devices (925).

The process 912 of reconstructing a slice may include several subprocesses. The virtual storage layer checks if all of the D chunks to reconstruct a slice is received (931). If yes, the virtual storage layer reconstructs the slice using an erasure coding algorithm with D chunks (935). If not, the virtual storage layer further checks if all the chunks in the current band are received (932). If all the chunks in the band are received, the virtual storage layer generates an error (936) because at least one of the received chunks may not be valid. If there are more chunks to receive, the virtual storage layer continues to receive them from another data storage device (933) and repeats the process until all the D chunks to reconstruct the slice is received. If any of the received chunk is either large nor huge (e.g., the chunk is for a small object), the virtual storage layer generates an error (936).

According to one embodiment, a data storage system includes: a plurality of data storage devices for storing a plurality of objects of a key-value pair; and a virtual storage layer that applies different data reliability schemes including a data replication scheme and an erasure coding scheme based on a size of an object of the plurality of objects. The plurality of objects includes a first object having a first size and a second object having a second size that is larger than the first size. The virtual storage layer classifies the first object as a small object, applies the data replication scheme, and stores the small object across one or more of the plurality of data storage devices. The virtual storage layer classifies the second object as a huge object, splits the huge object into one or more chunks of a same size, applies the erasure encoding scheme, and distributedly stores the one or more chunks across the plurality of data storage devices.

The distribution scheme may be a split-first distribution in which the virtual storage layer stores splits the one or more chunks of the huge object to each of the plurality of data storage devices and stores the one more chunks in each of the one or more chunks across the plurality of data storage devices.

The distribution scheme may be a band-first distribution scheme in which the virtual storage layer stores one chunk of the huge object to each of the plurality of data storage devices until the one or more chunks of the huge object is completely stored in the one or more data storage devices.

The virtual storage layer may further classify a third object having a third size as a large object, splits the large object into one or more chunks of a same size, applies the erasure encoding scheme, and distributedly stores the one or more chunks across the plurality of data storage devices, wherein the third size is larger than the first size and is smaller than the second size, and wherein the large object has only one band or only one chunk within a split.

The virtual storage layer may further classify a fourth object having a fourth size as a medium object, wherein the fourth size is larger than the first size and is smaller than the third size, and wherein the virtual storage layer applies one of the data replication scheme and the erasure coding scheme.

The object may be identified with a user key, and the virtual storage layer may create an internal key including the user key and a band identifier for the huge object, wherein the band identifier is used to identify a band among a plurality of bands, and each of the band of the plurality of bands includes one chunk of the one or more chunks distributed across the plurality of data storage devices.

The virtual storage layer may identify a start data storage device among the plurality of data storage devices using a hash value of the user key for writing or reading a first chunk of the one or more chunks.

The plurality of data storage devices may include one or more dedicated parity data storage devices that store parity chunks associated with the huge object.

The plurality of data storage devices may support a group feature, and the virtual storage layer may broadcast to the plurality of data storage devices with the band identifier is set to bits of arbitrary data when reading the huge object.

The plurality of data storage devices may not support a group feature, and the virtual storage layer may broadcast to the plurality of data storage devices with the band identifier is set to a unique band identifier when reading the huge object.

Each of the plurality of data storage devices may be a key-value solid-state drive (KV SSD).

According to another embodiment, a method for writing an object of a key-value pair includes: receiving a plurality of objects of a key-value pair, wherein the plurality of objects includes a first object having a first size and a second object having a second size that is larger than the first size; classifying the first object as a small object; applying a data replication scheme on the small object; storing the small object across one or more of a plurality of data storage devices; classifying the second object as a huge object; splitting the huge object into one or more chunks of a same size; applying an erasure coding scheme on the huge object; and distributedly storing the one or more chunks across the plurality of data storage devices.

The method may further include: receiving a write request for the object; determining that the object is the huge object; determining a chunk size and a chunk count for the huge object; and writing the one or more chunks of the huge object to the plurality of data storage devices based on the chunk size and the chunk count.

The method may further include: creating a slice that includes one chunk for each of the plurality of data storage devices among the one or more chunks and creating an internal key using a user key appended with a band identifier for each of the one more chunks included in the slice; creating a band that includes one or more parity chunks and the one or more chunks corresponding to the slice using the erasure coding scheme; determining the plurality of data storage devices to store the band based on a distribution scheme; and writing the one or more chunks in the band with the internal key.

The method may further include: receiving a write request for the object; determining that the object is the small object; determining a subset of the plurality of data storage devices to store the one or more chunks of the small object based on a distribution scheme; and writing the one or more chunks of the small object to the subset of the plurality of data storage devices.

The method may further include: receiving a read request for the object including the user key; determining whether the plurality of data storage devices supports a group feature; and broadcasting the read request with the internal key to the plurality of data storage devices.

The band identifier of the internal key may be set to bits of arbitrary data if the group feature is supported.

The band identifier of the internal key may be set to a unique band identifier if the group feature is not supported.

The method may further include: receiving at least one chunk from each of the plurality of data storage devices; and reconstructing a slice from the at least one chunks received from the plurality of data storage devices using the erasure coding scheme.

Each of the plurality of data storage devices may be a key-value solid-state drive (KV SSD).

The above example embodiments have been described hereinabove to illustrate various embodiments of implementing a data storage system capable of efficiently storing objects having different sizes and a method for storing those objects in the data storage system. Various modifications and departures from the disclosed example embodiments will occur to those having ordinary skill in the art. The subject matter that is intended to be within the scope of the invention is set forth in the following claims.

What is claimed is:

1. A data storage system comprising:
a plurality of data storage devices for storing a plurality of objects of a key-value pair; and
a virtual storage layer that manages device drivers for controlling the plurality of data storage devices and applies different data reliability schemes including a data replication scheme and an erasure coding scheme based on a size of an object of the plurality of objects,
wherein the plurality of objects includes a first object having a first size and a second object having a second size that is larger than the first size,
wherein the virtual storage layer classifies the first object as a small object, applies the data replication scheme, and stores the small object across one or more of the plurality of data storage devices, and
wherein the virtual storage layer classifies the second object as a huge object, splits the huge object into one or more chunks of a same size, applies the erasure encoding scheme, and distributedly stores the one or more chunks across the plurality of data storage devices, and
wherein the virtual storage layer provides a virtual storage unit to an application running on a host computer by grouping one or more data storage devices among the plurality of data storage devices based on classification of the plurality of objects.

2. The data storage system of claim 1, wherein the distribution scheme is a split-first distribution in which the virtual storage layer stores splits the one or more chunks of the huge object to each of the plurality of data storage devices and stores the one more chunks in each of the one or more chunks across the plurality of data storage devices.

3. The data storage system of claim 1, wherein the distribution scheme is a band-first distribution scheme in which the virtual storage layer stores one chunk of the huge object to each of the plurality of data storage devices until the one or more chunks of the huge object is completely stored in the one or more data storage devices.

4. The data storage system of claim 1, wherein the virtual storage layer further classifies a third object having a third size as a large object, splits the large object into one or more chunks of a same size, applies the erasure encoding scheme, and distributedly stores the one or more chunks across the plurality of data storage devices, wherein the third size is larger than the first size and is smaller than the second size, and wherein the large object has only one band or only one chunk within a split.

5. The data storage system of claim 4, wherein the virtual storage layer further classifies a fourth object having a fourth size as a medium object, wherein the fourth size is larger than the first size and is smaller than the third size, and wherein the virtual storage layer applies one of the data replication scheme and the erasure coding scheme.

6. The data storage system of claim 1, wherein the object is identified with a user key, and the virtual storage layer creates an internal key including the user key and a band identifier for the huge object, wherein the band identifier is used to identify a band among a plurality of bands, and each of the band of the plurality of bands includes one chunk of the one or more chunks distributed across the plurality of data storage devices.

7. The data storage system of claim 6, wherein the virtual storage layer identifies a start data storage device among the plurality of data storage devices using a hash value of the user key for writing or reading a first chunk of the one or more chunks.

8. The data storage system of claim 1, wherein the plurality of data storage devices includes one or more dedicated parity data storage devices that store parity chunks associated with the huge object.

9. The data storage system of claim 6, wherein the plurality of data storage devices supports a group feature, and the virtual storage layer broadcasts to the plurality of data storage devices with the band identifier is set to bits of arbitrary data when reading the huge object.

10. The data storage system of claim 6, wherein the plurality of data storage devices does not support a group feature, and the virtual storage layer broadcasts to the plurality of data storage devices with the band identifier is set to a unique band identifier when reading the huge object.

11. The data storage system of claim 1, wherein each of the plurality of data storage devices is a key-value solid-state drive (KV SSD).

12. A method for writing an object of a key-value pair, the method comprising:
receiving a plurality of objects of a key-value pair, wherein the plurality of objects includes a first object having a first size and a second object having a second size that is larger than the first size;
classifying the first object as a small object;
applying a data replication scheme on the small object;
storing the small object across one or more of a plurality of data storage devices;
classifying the second object as a huge object;
splitting the huge object into one or more chunks of a same size;
applying an erasure coding scheme on the huge object; and
distributedly storing the one or more chunks across the plurality of data storage devices.

13. The method of claim 12, further comprising:
receiving a write request for the object;
determining that the object is the huge object;
determining a chunk size and a chunk count for the huge object; and
writing the one or more chunks of the huge object to the plurality of data storage devices based on the chunk size and the chunk count.

14. The method of claim 13, further comprising:
creating a slice that includes one chunk for each of the plurality of data storage devices among the one or more chunks and creating an internal key using a user key appended with a band identifier for each of the one more chunks included in the slice;
creating a band that includes one or more parity chunks and the one or more chunks corresponding to the slice using the erasure coding scheme;
determining the plurality of data storage devices to store the band based on a distribution scheme; and
writing the one or more chunks in the band with the internal key.

15. The method of claim 12, further comprising:
receiving a write request for the object;
determining that the object is the small object;
determining a subset of the plurality of data storage devices to store the one or more chunks of the small object based on a distribution scheme; and
writing the one or more chunks of the small object to the subset of the plurality of data storage devices.

16. The method of claim 14, further comprising:
receiving a read request for the object including the user key;
determining whether the plurality of data storage devices supports a group feature; and
broadcasting the read request with the internal key to the plurality of data storage devices.

17. The method of claim 16, wherein the band identifier of the internal key is set to bits of arbitrary data if the group feature is supported.

18. The method of claim 16, wherein the band identifier of the internal key is set to a unique band identifier if the group feature is not supported.

19. The method of claim 16, further comprising:
receiving at least one chunk from each of the plurality of data storage devices; and
reconstructing a slice from the at least one chunk received from the plurality of data storage devices using the erasure coding scheme.

20. The method of claim 12, wherein each of the plurality of data storage devices is a key-value solid-state drive (KV SSD).

* * * * *